2,799,675

AMINO PROPANE DERIVATIVES AND PROCESS FOR THEIR MANUFACTURE

Gustav Ehrhart, Bad Soden am Taunus, and Heinrich Ott, Eppstein (Taunus), Germany, assignors to Farbwerke Hoechst Aktiengesellschaft vormals Meister Lucius & Brüning, Frankfurt am Main, Germany, a corporation of the Federal Republic of Germany No Drawing. Application August 10, 1954, Serial No. 449,027

Claims priority, application Germany August 17, 1953

7 Claims. (Cl. 260—247.2)

The present invention relates to amino propane derivatives and to a process for their manufacture.

It is already known that basically substituted propanes which contain aromatic or heterocyclic radicals possess valuable pharmaceutical properties. Thus, for example, the 1-piperidino-3,3-diphenyl propane possesses excellent spasmolytic properties (see U. S. Patent No. 2,446,522 and German Patent No. 908,136). The 1-dimethyl-amino-3-phenyl-3-pyridyl-(2')-propane known by the designation "Avil" (registered trademark) represents an excellent antihistamine preparation.

Now we have found new compounds are obtained by reacting butyric acid nitriles, which are substituted in alpha-position by a phenyl radical which may be substituted and in gamma-position by the group

$R_4$ and $R_5$ representing alkyl radicals of low molecular weight or together with

the radical of a heterocyclic ring, and which furthermore may carry in beta- and/or gamma-position alkyl radicals of low molecular weight containing at most 2 carbon atoms, with an 8-halogen caffeine in the presence of acid-binding agents and replacing in the compounds obtained the cyano group by hydrogen. Thereby compounds are obtained having the following constitution:

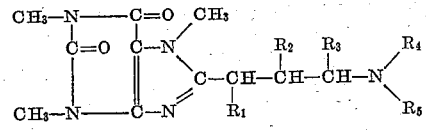

in which $R_4$ and $R_5$ have the meanings given above, $R_2$ and $R_3$ represent hydrogen or alkyl radicals of low molecular weight with at most 2 carbon atoms and $R_1$ represents a phenyl radical which may be substituted. As substituents in the phenyl radical there may be used for example halogen atoms and alkoxy groups with at most 4 carbon atoms in the alkyl radical.

These new compounds are valuable medicaments which possess very good sedative and blood pressure reducing properties.

As butyric acid nitriles which are substituted in gamma-position by the group

and in alpha-position by a phenyl radical which may be substituted and which may further carry in beta- and/or gamma-position alkyl radicals, there come into consideration for example: alpha-phenyl-gamma-dimethylamino-butyric acid nitrile, alpha-phenyl-gamma-diethylamino-butyric acid nitrile, alpha-phenyl-gamma-piperidino-butyric acid nitrile, alpha-phenyl-gamma-pyrrolidino-butyric acid nitrile, alpha-phenyl-gamma-morpholino-butyric acid nitrile, alpha-phenyl-beta-methyl-gamma-dimethylamino-butyric acid nitrile, alpha-phenyl-gamma-dimethylamino-valeric acid nitrile, alpha-meta-methoxyphenyl-gamma-dimethylamino-butyric acid nitrile, alpha-meta-methoxyphenyl-beta-methyl-gamma-dimethylamino - butyric acid nitrile, alpha - meta - methoxyphenyl-gamma-dimethylamino-valeric acid nitrile and alpha-para-chlorophenyl-gamma-dimethylamino-butyric acid nitrile.

As 8-halogen caffeine 8-chlorocaffeine is especially used.

As acid-binding agents there may be mentioned for example: alkalies, alkali amides, especially sodamide and alkali alcoholates.

Butyric acid nitriles are advantageously reacted with halogen caffeines in the presence of solvents.

Aromatic hydrocarbons such as benzene, toluene or xylene are particularly suitable as solvents. The reaction is advantageously carried out at a moderately raised temperature and the reaction mixture is subsequently boiled at the boiling temperature of the solvent.

The CN-group is advantageously split off by the action of strong acids, especially sulfuric acid. In order to convert the bases into the corresponding salts there may be used inorganic acids, for instance hydrohalic acids, such as hydrochloric acid, hydrobromic acid and hydriodic acid, sulfuric acid, phosphoric acid, and others or oganic acids, such as acetic acid, lactic acid, maleic acid, tartaric acid, malic acid, para-amino salicylic acid, amino-sulfonic acid, phenol-sulfonic acid, oxalic acid, succinic acid, hydroxyethane-sulfonic acid, and aceturic acid.

The following examples serve to illustrate the invention but they are not intended to limit it thereto:

Example 1

15 grams of finely pulverized sodamide are introduced at about 30° C., while stirring, into 50 grams of alpha-phenyl-gamma-dimethylamino-butyric acid nitrile, dissolved in 200 cc. of benzene and the mixture is stirred for another hour.

50 grams of finely pulverized 8-chlorocaffeine are then added at 30–40° C. and the reaction mixture is subsequently boiled for one hour under reflux. After cooling, the reaction mixture is mixed with water and the benzene solution is separated and extracted with the aid of dilute hydrochloric acid. The aqueous acid solution is mixed with sodium carbonate until it shows a feebly alkaline reaction, the base first being separated in the form of a viscous oil which solidifies after a short time. By recrystallization from a mixture of benzene and petroleum ether, 67 grams of alpha-phenyl-alpha-caffeyl-(8)-gamma-dimethylamino-butyric acid nitrile are obtained melting at 105–106° C. The hydrochloride melts at 264–265° C. with evolution of gas.

50 grams of alpha-phenyl-alpha-caffeyl-(8)-gamma-dimethylamino-butyric acid nitrile are dissolved in 200 grams of sulfuric acid of 70 percent strength and the solution is heated for 3 hours to 140° C. in an oil bath. After cooling, the reaction mixture is diluted with water and rendered alkaline with the aid of sodium carbonate. The base which has separated solidifies after a short time and melts at 114–115° C. after having been recrystallized from cyclohexane. After the conversion of the base into the hydrochloride, 45 grams of 1-phenyl-1-caffeyl- (8')-3-dimethyl-amino-propane hydrochloride are obtained melting at 215–216° C.

Example 2

22.8 grams of alpha-phenyl-gamma-piperidino-butyric acid nitrile, dissolved in 50 cc. of benzene, and 4.5 grams of finely pulverized sodamide are boiled for one hour under reflux. 22.8 grams of 8-chlorocaffeine are then introduced into the reaction mixture and the whole is boiled for another hour under reflux. After cooling, the reaction mixture is mixed with water, the benzene solution is extracted with dilute hydrochloric acid and the acid solution is rendered alkaline with the aid of sodium carbonate. The major part of the separated base solidifies on cooling. By recrystallization from a small portion of alcohol mixed with a small quantity of water the alpha-phenyl-alpha-caffeyl-(8)-gamma-piperidino - butyric acid nitrile is obtained in the form of a white crystalline powder melting at 149–150° C.

9.5 grams of alpha-phenyl-alpha-caffeyl-(8)-gamma-piperidino-butyric acid nitrile in 40 grams of sulfuric acid of 70 percent strength are heated for 3 hours to 145° C. in an oil bath. After cooling, the reaction mixture is diluted with water and rendered alkaline by means of sodium carbonate, the 1-phenyl-1-caffeyl-(8')-3-piperidino propane being separated as a viscous mass. It is taken up in ether and converted into the hydrochloride. By recrystallization from a mixture of acetone and ether there are obtained 6.7 grams of 1-phenyl-1-caffeyl-(8')-3-piperidino propane hydrochloride in the form of a white crystalline powder melting at 206–207° C.

Example 3

To 78 grams of phenyl-acetonitrile, dissolved in 200 cc. of benzene, there are first added in small portions 81 grams of 1-dimethylamino-2-chloropropane and then 30 grams of finely pulverized sodamide. The mixture is then boiled for 1 hour under reflux. After cooling, the reaction mixture is mixed with water and the benzene solution separated and extracted with dilute hydrochloric acid. The aqueous acid solution is rendered alkaline by means of sodium hydroxide solution and the precipitated base is separated and distilled under reduced pressure. 84 grams of a mixture of alpha-phenyl-beta-methyl-gamma-dimethylamino-butyric acid nitrile and alpha-phenyl-gamma-dimethylamino-valeric acid nitrile having a boiling point of 167–170° C. under a pressure of 18 mm. of mercury are obtained in the form of a colorless oil.

The mixture so obtained is dissolved in 100 cc. of benzene, mixed with 18.7 grams of finely pulverized sodamide and boiled for one hour under reflux. To the reaction mixture so obtained 95 grams of 8-chlorocaffeine are then added in portions. A clear solution is formed which is further heated for ½ hour under reflux. After cooling, the mixture is diluted with water and the benzene solution separated and extracted with dilute hydrochloric acid. The aqueous acid solution is rendered alkaline with the aid of sodium carbonate, 90 grams of a mixture of bases being separated which solidify after some time. By recrystallization from hot isopropyl alcohol, a mixture of alpha-phenyl-alpha-caffeyl-(8)- beta - methyl - gamma-dimethylamino-butyric acid nitrile and alpha-phenyl-alpha-caffeyl-(8)-gamma-dimethyl-amino-valeric acid nitrile is obtained in the form of a white crystalline powder melting at 180–190° C.

46 grams of the mixture of nitriles so obtained are dissolved in 200 grams of sulfuric acid of 70 percent strength and the solution is heated for 3 hours at 145° C. in an oil bath. After cooling, the reaction mixture is diluted with water and rendered alkaline with the aid of sodium carbonate, a mixture of 1-phenyl-1-caffeyl-(8')-2-methyl-3-dimethylamino propane and 1-phenyl-1-caffeyl-(8')-3-dimethylamino butane being separated. By recrystallization from a mixture of methanol and a small quantity of water, 33 grams of the above mixture are obtained in the form of a white crystalline powder melting at 125–135° C. The hydrochloride of the mixture melts at 254–255° C. with evolution of gas.

Example 4

66 grams of meta-methoxyphenylacetonitrile and 48 grams of dimethylaminoethyl chloride are dissolved in 200 cc. of benzene. To the solution so obtained 20 grams of finely pulverized sodamide are added in portions, while stirring and temporarily cooling. After the reaction mixture has been worked up as described in Example 3, 82 grams of alpha-(meta-methoxyphenyl)-gamma-dimethyl-amino-butyric acid nitrile are obtained as a nearly colorless thick oil boiling at 160–162° C. under a pressure of 5 mm. of mercury.

82 grams of alpha-(meta-methoxyphenyl)-gamma-dimethyl-amino-butyric acid nitrile dissolved in 320 cc. of benzene and 17 grams of finely pulverized sodamide are boiled for one hour under reflux. 85.5 grams of 8-chlorocaffeine are then introduced in small portions into the reaction mixture and the whole is boiled for ½ hour under reflux. After cooling, the reaction mixture is diluted with water and the benzene solution is separated and extracted with dilute hydrochloric acid. The acid aqueous solution is rendered alkaline with the aid of sodium carbonate. The base first precipitating in the form of a viscous oil solidifies after some hours. After being recrystallized from a mixture of methyl alcohol and a small portion of water, the alpha-meta-methoxyphenyl-alpha - caffeyl-(8)-gamma-dimethylamino-butyric acid nitrile is obtained in the form of a colorless crystalline powder melting at 117° C.

25 grams of alpha-meta-methoxyphenyl-alpha-caffeyl-(8)-gamma-dimethylamino-butyric acid nitrile are dissolved in 100 cc. of sulfuric acid of 70 percent strength and heated for 3 hours at 145° C. in an oil bath. After cooling, the reaction mixture is diluted with water and rendered alkaline with the aid of sodium carbonate. The base first separates as a viscous oil but solidifies after a short time. By recrystallization from a mixture of methyl alcohol annd a small quantity of water, 13.5 grams of 1-meta-methoxy-phenyl-1-caffeyl-(8') - 3 - dimethylamino propane are obtained in the form of a colorless crystalline powder melting at 211–212°C. The hydrochloride melts at 250–252° C.

Example 5

21.4 grams of alpha-phenyl-gamma-diethylamino-butyric acid nitrile are dissolved in 100 cc. of benzene, 5 grams of finely pulverized sodamide are added and the whole is stirred for 1 hour at about 30° C., the separated sodium compound converting the solution into a thinly liquid salt magma. 22.8 grams of 8-chlorocaffeine are then added in small portions at about 30–35° C. and the mixture is boiled for ½ hour under reflux. After cooling, the reaction mixture is mixed with water and extracted with dilute hydrochloric acid after the benzene solution has been separated. The acid aqueous solution is clarified with the aid of animal charcoal and rendered alkaline by means of sodium carbonate, the alpha-phenyl-alpha-caffeyl-(8)-gamma-diethylamino-butyric acid nitrile separating as a viscous oil which becomes crystalline when triturated with a small portion of petroleum ether. After being recrystallized from cyclohexane the product obtained melts at 91–92° C.

11 grams of alpha-phenyl-alpha-caffeyl-(8)-gamma-diethylamino-butyric acid nitrile together with 44 grams of sulfuric acid of 80 percent strength are heated for 3 hours on an oil bath to an exterior temperature of 150–155° C., with vigorous evolution of carbon dioxide at the beginning of the reaction. After cooling, water is added to the mixture which is then rendered weakly alkaline with sodium carbonate. 1-phenyl-1-caffeyl-(8')-3-diethylamino propane separates as a viscous oil which solidifies in the form of crystals after standing for some hours. After being recrystallized from cyclohexane, the product obtained melts at 136–137° C.

Example 6

46 grams of alpha-para-chlorophenyl-gamma-dimethyl-amino-butyric acid nitrile are dissolved in 150 cc. of benzene, 9.5 grams of finely pulverized sodamide are added at 35–40° C., while stirring, and after standing for ½ hour the reaction mixture is boiled for 15 minutes under reflux. The mixture is then cooled to 35–40° C. and 46 grams of finely pulverized 8-chlorocaffeine are added in small portions. The reaction mixture is then boiled for ½ hour, cooled and mixed with water. The benzene solution is separated and extracted with dilute hydrochloric acid. The acid aqueous solution is clarified with the aid of animal charcoal and rendered weakly alkaline with sodium carbonate, a viscous oil separating which soon solidifies in the form of crystals when triturated with a small portion of petroleum ether. By recrystallization from benzene and addition of petroleum ether, alpha-para-chlorophenyl-alpha-caffeyl-(8) - gamma - dimethyl-amino-butyric acid nitrile is obtained in the form of a white crystalline powder melting at 99–100° C. 45.5 grams of alpha - para - chlorophenyl-gamma-caffeyl-(8)-gamma-dimethylamino-butyric acid nitrile are dissolved in 180 grams of sulfuric acid of 80 percent strength and the solution is heated for 3 hours on an oil bath, the bath temperature being 150° C. The vigorous evolution of carbon dioxide setting in at the beginning of the reaction is then completely terminated. The mixture is then diluted with water and rendered weakly alkaline with the aid of sodium carbonate, a viscous oil separating which solidifies after standing for some hours. By recrystallization from the same amount of hot butylacetate, 1-para-chloro-phenyl-1-caffeyl-(8′)-3-dimethylamino propane is obtained as a white crystalline powder melting at 130° C. After neutralizing the base with the calculated amount of aqueous hydrochloric acid, evaporating the residue under reduced pressure and purifying it by dissolution and reprecipitation from alcohol+ether, the hydrochloride with 2 mols of crystalline water separates in the form of crystals melting at about 110° C.

Example 7

36 grams of alpha - phenyl-gamma-morpholino-butyric acid nitrile are dissolved in 100 cc. of benzene, and after the addition of 7.8 grams of finely pulverized sodamide, the reaction solution is stirred for one hour at 30° C. and subsequently boiled for ¼ hour. After cooling, 36 grams of finely pulverized 8-chlorocaffeine are introduced in small portions at 35–40° C. and the reaction mixture is boiled for 1 hour under reflux. It is then mixed with water; the benzene solution is separated and extracted with dilute hydrochloric acid. The aqueous acid solution is clarified with a small portion of animal charcoal, rendered alkaline with sodium carbonate and the oily base which has separated is taken up in ether. After drying with potash and removal of the ether by distillation there remains a light brown thick oil which solidifies to a white crystalline magma when being triturated with a small porton of ether. By recrystallization from methyl alcohol and water, alpha-phenyl-alpha-caffeyl-(8)-gamma-morpholino-butyric acid nitrile is obtained in the form of a white crystalline powder melting at 174–175° C.

9 grams of alpha-phenyl-alpha-caffeyl-(8)-gamma-morpholino-butyric acid nitrile together with 36 grams of sulfuric acid of 80 percent strength are heated for two hours in an oil bath to an exterior temperature of 150° C. After cooling, the mixture is diluted with water and rendered alkaline with sodium carbonate. The oily base which has separated is taken up in methylene chloride, decolorized with animal charcoal and distilled off. The viscous oily residue is converted into a white crystalline magma when triturated with a small portion of ether. After recrystallization from hot methyl alcohol, 1-phenyl-1-caffeyl-(8′)-3-morpholino propane is obtained as a white crystalline powder melting at 165–166° C.

We claim:

1. A member selected from the group consisting of compounds of the general formula:

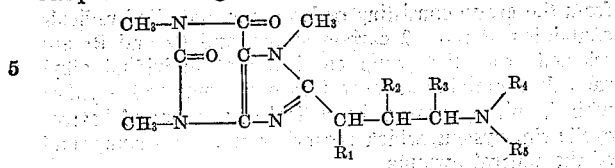

in which $R_1$ represents a member selected from the group consisting of the phenyl radicals, alkoxy phenyl radicals having at most 4 carbon atoms in the alkyl group, and chloro phenyl radicals, $R_2$ and $R_3$ are substituents selected from the group consisting of hydrogen and alkyl radicals containing at most 2 carbon atoms, and $R_4$ and $R_5$ are selected from the group consisting of individual alkyl radicals containing at most 4 carbon atoms and together with the nitrogen atom the radical of a saturated heterocyclic ring system, and acid addition salts thereof.

2. The compound of the formula

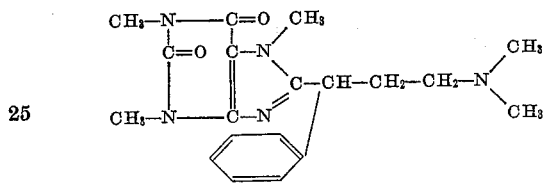

3. The compound of the formula

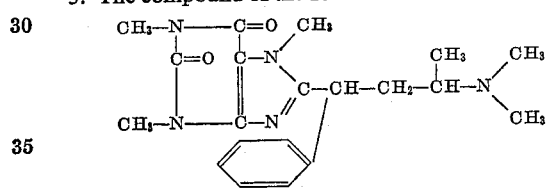

4. The compound of the formula

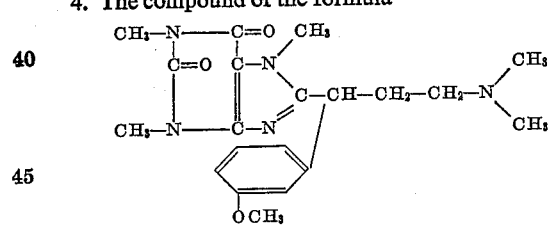

5. The compound of the formula

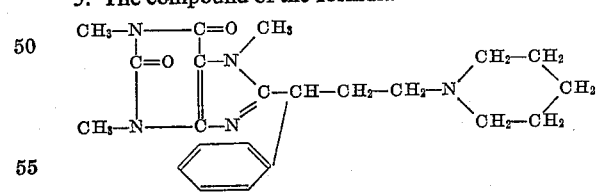

6. The compound of the formula

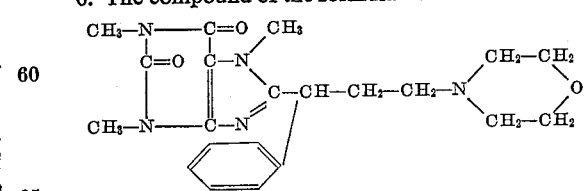

7. The process of preparing acid addition salts of amino-propane compounds of the general formula

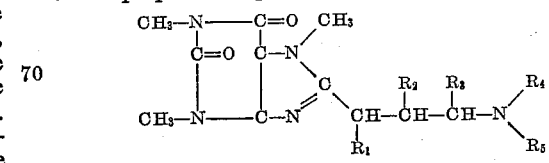

in which $R_1$ represents a member selected from the group consisting of the phenyl radicals, alkoxy phenyl radicals having at most 4 carbon atoms in the alkyl group, and chloro phenyl radicals, $R_2$ and $R_3$ are substituents selected from the group consisting of hydrogen and alkyl radicals containing at most 2 carbon atoms, and $R_4$ and $R_5$ are selected from the group consisting of individual alkyl radicals containing at most 4 carbon atoms and together with the nitrogen atom the radical of a saturated heterocyclic ring system, which comprises reacting a compound of the general formula

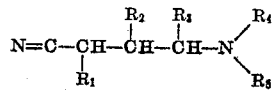

wherein $R_1$, $R_2$, $R_3$, $R_4$, and $R_5$ have the meanings given above, with 8-chlorocaffeine in the presence of an acid-binding agent and of an indifferent solvent at temperatures between 30° and the 50°, refluxing the reaction mixture obtained at the boiling point of the solvent used and reacting the resulting nitrile with a strong inorganic acid, whereby the cyano group of the nitrile is replaced by hydrogen.

References Cited in the file of this patent

UNITED STATES PATENTS 2,534,243   Cusic ------------------ Dec. 19, 1950

FOREIGN PATENTS 44,373   Australia --------------- Mar. 1, 1910